A. KINGSBURY.

HORIZONTAL THRUST BEARING.

APPLICATION FILED FEB. 14, 1918.

Reissued June 8, 1920. 14,878.

INVENTOR

Albert Kingsbury

BY Sarbous

ATTORNEY

UNITED STATES PATENT OFFICE.

ALBERT KINGSBURY, OF PITTSBURGH, PENNSYLVANIA.

HORIZONTAL-THRUST BEARING.

14,878. Specification of Reissued Letters Patent. Reissued June 8, 1920.

Original No. 1,201,057, dated October 10, 1916, Serial No. 756,839, filed March 26, 1913. Application for reissue filed February 14, 1918. Serial No. 217,267.

*To all whom it may concern:*

Be it known that I, ALBERT KINGSBURY, a citizen of the United States, and a resident of Pittsburgh, in the county of Allegheny and State of Pennsylvania, have invented certain new and useful Improvements in Horizontal-Thrust Bearings, of which the following is a specification, reference being had to the accompanying drawings, forming a part thereof.

My invention relates to fluid lubricated bearings and has special reference to bearings which are adapted to sustain the end thrust of horizontal shafts.

I prefer to embody my invention in a bearing of the general type shown and described in Patent 947,242 issued January 25, 1910, on an application filed by me on May 20, 1907, although I do not intend to limit my invention to any specific structure.

One object of my invention is to provide a bearing of the class above indicated that shall embody automatic means for supplying a flood or bath of oil or other lubricating fluid to the contacting surfaces without resorting to independent pumping devices.

Another object is to provide a thrust bearing of the shoe type that shall be adapted to sustain large horizontal thrust pressures and to automatically establish and maintain an oil film between each of the bearing shoes and its opposed bearing surface.

Other objects will be hereinafter set forth.

I will describe my invention in the following specification and point out the novel features thereof in appended claims.

Figure 2:
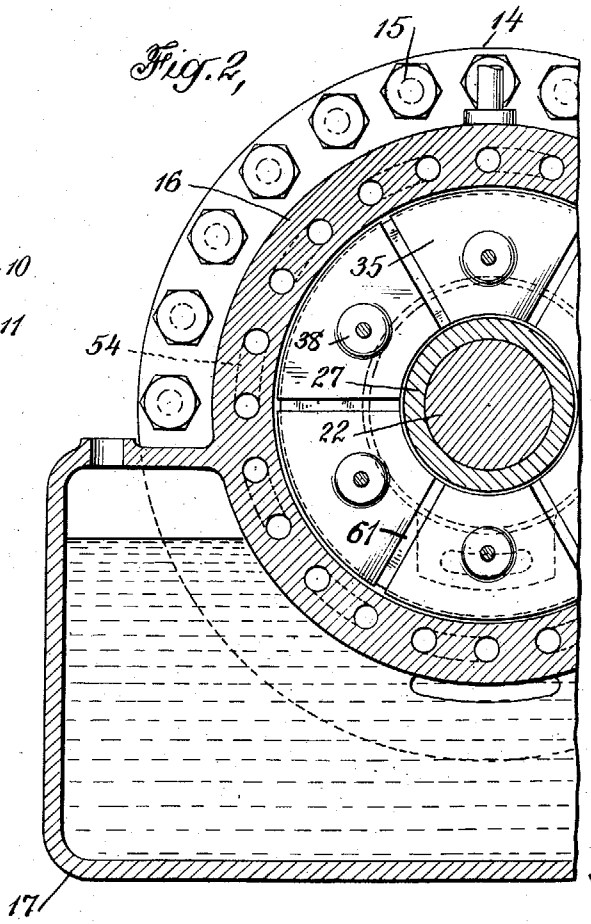
Figure 1:
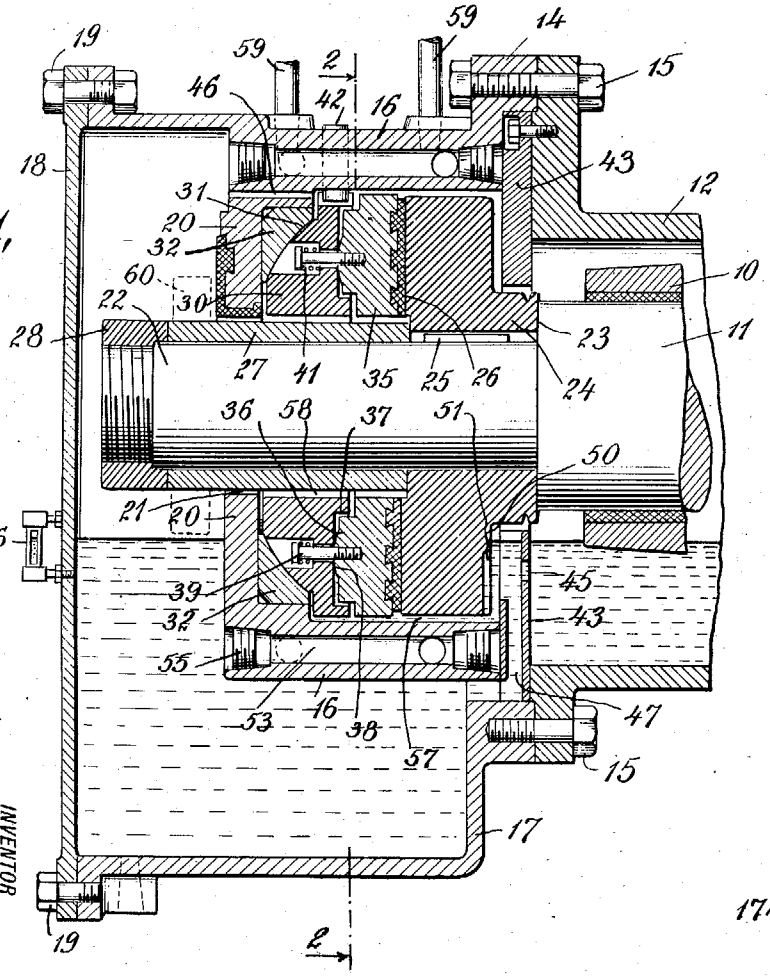

Referring to the drawings—Figure 1 is a view in longitudinal section of a bearing constructed in accordance with and embodying my invention. The same bearing is shown in Fig. 2 which is a transverse sectional view on the line 2—2 of Fig. 1.

10 is a bearing in which a horizontal shaft 11 is supported. This bearing may be of any suitable construction and since it forms no part of my invention, it is not shown or described in detail.

12 is a stationary housing and is provided with a flange to which a housing 14 of my improved thrust bearing is secured by bolts 15. The housing 14 comprises a hollow cylindrical body 16 and a substantially rectangular oil well 17, a portion of which is integral therewith, an end plate 18 being secured to the housing by bolts 19 and constituting a removable retaining wall of the oil chamber. The hollow cylindrical body 16, hereinafter referred to as the cylinder 16, has a head 20 provided with a central opening 21 through which an extension 22 of the shaft 11 projects. Mounted on the shaft extension against a shoulder 23 is a collar 24 which is held against rotation relatively to the shaft by a spline 25 and has an annular thrust bearing surface 26. The collar is clamped against the shoulder by a sleeve 27 and a nut 28 which is screwed onto the end of the shaft extension.

An annular support or base ring 30 has a spherically curved surface 31 and is seated on an equalizing washer 32 which is fitted into the end of the cylinder 16 against the head 20. Radial bearing shoes 35 are tiltingly supported in the cylinder 16 upon the base ring 30 and are arranged to engage the bearing surface 26 of the collar 24. Each shoe has a projection 36 which fits loosely into an annular groove 37 of the base ring and a curved seat 38. It is thus prevented from rotating on its seat and is free to tilt in operation and assume a slightly inclined position relative to the bearing surface of the collar. The shoes are held in place by bolts 39 which extend loosely through suitable holes in the base ring and are screwed into the shoes, the holes being countersunk to admit the heads of the bolts and springs 41 being interposed under the heads. The bolts do not prevent the tilting of the shoes. A plug 42 extends through the cylinder wall into a notch in the base ring, but any other suitable means for preventing the rotation of the ring may be used. The ring automatically assumes such a position as to equalize the pressure on the shoes.

It will be noted that the bearing shoes are mounted in such a manner that they are free to tilt not only circumferentially or tangentially—in order to permit of the formation of wedge shaped oil films between the bearing surfaces—but also radially or transversely. The combination of radially tiltable shoes with an equalizing support—such as the base ring 30 and equalizing washer 32—is of great advantage in all thrust bearing constructions that are subjected to heavy loads, but it is particularly important and desirable in the case of horizontal thrust bearings in which the end thrust is, in most cases, received and sustained on a member that is offset with respect to the main frame of the machine. In such cases the end thrust not only tends to bend the support for the stationary member of the bearing, and thereby throw the bearing surfaces out of parallelism with each other; but also tends to throw a greater load on the parts of the bearing shoes that are closest to the main frame support and thereby cause unequal heating of different zonal portions of the engaging surfaces. Still another cause of difficulty which is encountered in the use of horizontal or inclined thrust bearings is the location of the upper shoes above the level of the oil reservoir, and the consequent difficulty in securing equally good lubrication of all portions of the stationary bearing surfaces. The use of an equalizer support for the bearing shoes will permit the latter to adjust themselves to parallelism with the thrust collar surface only as long as both surfaces—the surface of the shoes and the surface of the collar—remain true planes; and even then the adjustment will not be perfect because of the frictional resistance to the tilting movement of the equalizer support as a whole. In order to obtain uniform bearing engagement between the inner and outer portions of the relatively rotatable bearing surfaces under the actual varying conditions of operation, the use of an equalizer support must be supplemented and rendered efficient by the use of pivotal supports for the individual shoes which will allow those shoes to rock or tilt freely in radial planes, as either or both of the coöperating bearing members shift in position or alter in form under the varying conditions of operation. For example, the surface of the collar is likely to become crowned, due to the frictional heating of the parts when the bearing is in operation.

Secured to the left hand end of the housing 12 is a partition which is in the form of a ring 43 and loosely surrounds the hub of the collar 24. At the bottom of the ring 43 a cored passage 47 communicates with the oil well 17 at the bottom and opens into the cylinder at the back of the thrust collar 24. The opening 45 in the ring 43 is arranged to equalize the oil level in the housing 12 and the well 17.

The back radial surface 50 of the thrust collar may be provided with radial grooves 51, in order to form shallow vanes or blades, for the purpose of enhancing the oil pumping action as hereinafter explained, or projections may be secured to the surface 50 for the same purpose, but neither of these expedients is essential to the operation of the bearing, because a large proportion of the bearing surface 26 is engaged by the relatively stationary shoes 35 and the centrifugal action is much greater at the unobstructed surface 50 even if this surface is smooth.

There is established as a result of this arrangement, what may be termed a reverse circulation of lubricating fluid over and through the parts of the bearing members. In this reverse circulation the oil is first thrown outwardly to the external periphery of the rotating parts and, by reason of the pressure thus established, is then forced inwardly through the spaces or passages 61 between the shoes, to the central chamber surrounding the shaft, from which it again flows outwardly. This reverse circulation—which is in the direction opposite to that normally resulting from the centrifugal action of the parts as heretofore arranged, is a very effective means for supplying oil to the coöperating bearing surfaces and particularly to those portions of the bearing surfaces which are near the shaft and are most liable to run dry under usual conditions. The advantages of this arrangement are particularly marked as applied to a thrust bearing of the horizontal type because of the difficulty usually experienced in obtaining a uniform distribution of oil.

The walls of the cylinder 16 are preferably made relatively thick and are provided with means such as for example a plurality of longitudinal holes 53 which are connected alternately at opposite ends by passages 54 to provide a zigzag or tortuous path for water or other suitable cooling liquid, the ends of the holes 53 being closed by plugs 55.

The operation of the bearing is as follows: Assuming that as indicated in the drawings, the oil level is maintained at, or slightly above the opening 45 (this level may be indicated outside of the housing by an oil column 56 or other suitable means) oil will be forced, when the shaft 11 and the collar 24 are rotating, radially outward along the surface 50 of the collar by reason of the centrifugal forces which act upon it. Thus the oil is forced through a thin annular space 57 into the cylinder 16, flooding the bearing surfaces and filling all the spaces which are provided between the shoes 35, between the shoes and the base ring 30, and between the base ring and the equalizing ring 32. The oil is discharged through an annular passage 58 and out of the restricted opening 21 into the oil well 17. A small hole 46 permits the escape of any air that might otherwise accumulate in the upper part of the cylinder 16.

The relative movement of the annular thrust bearing surface 26 over the surfaces of the universally pivoted shoes 35 forces the inwardly flowing currents of oil into the forward or advance edges of the spaces between the annular surface and the shoes, thereby tilting the shoes circumferentially or tangentially and establishing the wedge shaped films of oil which are characteristic of the operation of my general type of thrust bearings. At the same time the free radial movement of the shoes in combination with the rocking or tilting movement of the universally pivoted equalizer ring 30, permits the bearing surface of each shoe to adjust itself to radial parallelism with the surface 26 and constantly maintain that parallelism in the continued operation of the bearing regardless of changes in the axial relationship of the coöperating bearing members, and regardless of the radial distortion or "crowning" of one or more surfaces of those members. This coöperative and conjoint rocking action of the radially tiltable shoes 35 and of the equalizer ring 30 therefore not only distributes the bearing pressure over different circumferential portions of the thrust engaging surfaces, but also establishes and maintains uniformity of thickness in the wedge shaped oil films along radial lines; and thus facilitates and assists in maintaining freedom of radial distribution of the lubricant between the bearing surfaces. I have found that this maintenance of radial uniformity in the thickness of the oil film is a very important and necessary factor in securing the proper free circulatory movement of the lubricant over and between the engaging surfaces of thrust bearings of this class, and in obtaining the most efficient antifrictional action of such structures. The attainment of the last mentioned result is particularly important and desirable in the case of horizontal thrust bearings in which there is a forced reverse oil circulation of the character hereinbefore described, because in that case the inward movement of the oil across the bearing surfaces is opposed to the centrifugal action of the contiguous rotating parts.

The uniform flow of the oil through the wedge shaped openings between the bearing surfaces is also facilitated, and the efficiency of action correspondingly increased, by the cooling of the lubricant as it flows over the water chilled walls of the cylinder 16. This cooling arrangement is particularly effective in reducing the temperature of the oil since the annular chamber 57 is thin and contains only a small quantity of oil at a time. This small quantity of oil is distributed over the relatively large inner surface of the cylinder 16, the temperature of the cylinder being held at a determined or desired value by the cooling water which is supplied to and discharged from the zigzag passage hereinbefore described, through pipes 59. Not only is the cooling system efficient by reason of the fact that the oil is spread over a large cooling surface but also because the oil is circulated rapidly over the cooling surface.

The opening 45 may obviously be closed without affecting the operation of the bearing but by connecting the oil well 17 to the housing 12, a larger body of oil is available and consequently the oil level is subject to less variation in height.

A check collar 60, shown in broken lines in Fig. 1, may be mounted on the sleeve 27 if desired.

Variations in size and arrangement of parts may be effected within the spirit and scope of my invention and I only intend to be limited by the appended claims.

What I claim is:

1. A thrust bearing comprising a rotatable thrust member having a radial oil-throwing surface and a bearing surface, stationary bearing members coöperating with the bearing surface of the rotatable member, an annular shell arranged in close proximity to the radial oil-throwing surface of the rotatable member and forming an oil chamber which surrounds the bearing members, an oil containing reservoir for supplying oil to the oil-throwing surface, and an outlet from the said annular chamber near the axis of the rotatable member and adjacent to the stationary bearing members.

2. A thrust bearing comprising a rotatable thrust member having a radial oil-throwing surface on one side and a bearing surface on the other, stationary bearing members coöperating with the bearing surface of the rotatable member, and a hollow shell closely adjacent to the rotatable member and forming an annular oil chamber which surrounds the bearing members, the said chamber having an inlet opening opposite the oil-throwing surface and an outlet opening near the axis of the rotatable member.

3. A horizontal bearing comprising a rotatable thrust collar having an oil-throwing surface on one side and a bearing surface on the other, stationary bearing shoes engaging a relatively large proportion of the bearing surface of the thrust collar, and an annular shell closely adjacent to the oil-throwing and circumferential surfaces of the rotatable member and forming an annular oil chamber which surrounds the bearing members, the said chamber having an inlet opening opposite the oil-throwing surface and an outlet opening near the axis of the rotatable member opposite the stationary bearing members, whereby oil is automatically forced into the chamber through the confined spaces between the shell and the rotatable member and escapes through the outlet opening.

4. A thrust bearing comprising a rotatable thrust member having a radial oil-throwing surface on one side and a bearing surface on the other, stationary bearing members cooperating with the bearing surface of the rotatable member, an annular shell closely adjacent to the oil-throwing and circumferential surfaces of the rotatable member and forming an annular oil chamber which surrounds the bearing members and which is provided with an outlet near the axis and on the same side of the thrust member as the stationary bearing members, and means for cooling the chamber adjacent to the restricted circumferential opening between the shell and the bearing members.

5. A horizontal bearing comprising a rotatable thrust collar having an oil-throwing surface on one side and a bearing surface on the other, stationary bearing shoes engaging a relatively large proportion of the bearing surface of the thrust collar, an annular shell closely adjacent to the oil-throwing and circumferential surfaces of the rotatable member and forming an annular oil chamber which surrounds the bearing members and has an inlet opening opposite the oil-throwing surface and an outlet opening near the axis of the rotatable member opposite the stationary bearing members, whereby oil is automatically forced through the narrow annular space between the shell and the rotatable member and escapes through the outlet opening, and cooling means adjacent to the said narrow annular space.

6. A thrust bearing comprising relatively rotatable thrust members, one of which has an annular bearing surface and the other of which has a coöperating bearing surface provided with radial passages, and means for establishing and maintaining a circulation of oil radially inward through the said radial passages to the bearing surfaces when the bearing is in operation.

7. A thrust bearing comprising a rotatable thrust member having a bearing surface, relatively stationary spaced bearing members coöperating therewith, an oil chamber surrounding the bearing members, and means for establishing a circulation of oil radially inward between the stationary members and across said bearing surface when the bearing is in operation.

8. A thrust bearing comprising a rotatable thrust member having an annular bearing surface, annularly spaced tiltable bearing shoes coöperating therewith, an oil chamber surrounding the bearing members, and means for establishing and maintaining a circulation of oil radially inward through the spaces between the bearing shoes and over said annular bearing surface when the bearing is in operation.

9. A thrust bearing comprising a rotatable thrust member having an annular bearing surface, annularly spaced tiltable bearing shoes coöperating therewith, an oil chamber surrounding the bearing members and means, dependent upon the rotatable member, for maintaining a circulation of oil radially inward through the spaces between the shoes and over said annular bearing surface.

10. In a thrust bearing the combination of two relatively rotatable bearing members, a series of shoes pivotally mounted on one of the members and free to tilt in any direction thereon, and an equalizing means for supporting one of the members and adapted to permit the said member to also tilt as a whole in any direction.

11. A thrust bearing comprising in combination two relatively rotatable bearing members, one of said members being provided with a substantially plane continuous bearing surface, and the other of said members carrying an annularly arranged plurality of bearing segments that are free to tilt in any direction with respect to the supporting member, and an equalizing means on which one of the members is mounted to rock in any direction.

12. A thrust bearing comprising in combination a rotating member and a stationary member, one of said members being mounted to tilt freely in any direction, and a series or plurality of bearing shoes pivotally supported on one of said members and adapted to tilt freely in radial planes.

13. A thrust bearing comprising in combination two relatively rotatable members one of which is tiltably supported for rocking movement in any direction, and a plurality of bearing shoes or segments supported on one of the members and adapted to tilt freely thereon in radial planes.

14. A thrust bearing comprising in combination two relatively rotatable members, one of which is tiltably supported for rocking movement in any direction, and a plurality of bearing shoes or segments mounted on said tiltably supported member and adapted to tilt freely thereon in radial planes.

15. In a thrust bearing, the combination of two relatively rotatable bearing members, a tiltably mounted base and a plurality of bearing shoes mounted on the base and adapted to tilt in radial planes.

16. In a thrust bearing, the combination of two relatively rotatable bearing members, a tiltably mounted base and a plurality of bearing shoes mounted on the base and adapted to tilt in all directions.

17. In a thrust bearing, the combination of two relatively rotatable bearing members, a base mounted on one member with a ball and socket connection, and a plurality of bearing shoes supported by the base and tiltable thereon in all directions.

18. In a thrust bearing the combination with two relatively rotatable members, a base mounted on one of the members by a universal pivot, and a plurality of thrust bearing shoes loosely attached to the base and adapted to tilt thereon in radial planes.

19. A thrust bearing comprising a member having a substantially continuous annular bearing face, a plurality of annularly arranged bearing shoes or segments cooperating therewith, a support on which the said shoes are mounted for radial tilting and equalizing means for circumferentially distributing the pressure over the surfaces of engagement between the shoes and the annular bearing face.

20. A thrust bearing comprising in combination, two relatively rotatable members, a plurality of bearing shoes carried on one of the members and pivotally mounted thereon for free tilting movement in radial planes, equalizing means for supporting one of said members and permitting it to rock in any direction, and means for continuously supplying lubricant to all of the pivotally mounted bearing shoes when the bearing is in operation.

21. A thrust bearing comprising in combination, two relatively rotatable members, a plurality of bearing shoes carried on one of the members and pivotally mounted thereon for free tilting movement in radial planes, equalizing means for supporting one of said members and permitting it to rock in any direction, and means for providing a continuous flow of oil radially inward to the cooperating bearing surfaces.

22. A horizontal thrust bearing comprising in combination, two relatively rotatable members, a plurality of bearing shoes carried on one of the members and pivotally mounted thereon for free tilting movement in radial planes, equalizing means for supporting one of said members and permitting it to rock in any direction, means for maintaining a flow of oil over the bearing surfaces and between the shoes when the bearing is in operation, and means for cooling the oil before it flows into the bearing openings.

23. A thrust bearing comprising in combination two relatively rotatable bearing members, means for mounting the said members whereby the engaging bearing surfaces thereof are maintained in radial parallelism under changes in axial alinement and unequal heating of the bearing parts, and means for establishing and maintaining a flow of oil between the engaged surfaces when the bearing is in operation.

24. A thrust bearing comprising two relatively rotatable bearing members, means for mounting the said members whereby the thrust engaging surfaces thereof are automatically maintained in radial parallelism under the varying conditions of pressure thereon, and means, dependent upon the rotative movement of one of the bearing members, for maintaining a flow of oil between the thrust engaging surfaces when the bearing is in operation.

25. A horizontal thrust bearing comprising a rotatable member having a plane thrust surface, a relatively stationary member having a segmental bearing face coöperating with the thrust surface and maintained in radial parallelism thereto, an oil reservoir for flooding the lower part of the aforesaid surfaces, and means for maintaining a flow of oil upwardly from the reservoir to the upper side of the rotating member and thence laterally and inwardly to and through the thrust engaging surfaces.

26. A horizontal thrust bearing comprising a shaft, a thrust collar thereon having a cylindrical surface and a grooved end face, a hollow cylindrical shell arranged in close proximity to the said cylindrical surface and grooved end face, a hollow base communicating with the cylindrical shell and constituting an oil reservoir in which the lower part of the collar may be immersed, and relatively stationary bearing members mounted within the cylindrical shell and arranged to coöperate with the thrust collar, the grooved end face of the collar being adapted to maintain a flow of oil from the reservoir to the external periphery of the collar and thence laterally and inwardly to and between the coöperating bearing surfaces.

27. A horizontal thrust bearing comprising a rotatable member having a thrust surface and a cylindrical oil-carrying surface adjacent thereto, relatively stationary thrust bearing members, an oil reservoir for immersing the lower part of said members, and a cylindrical shell closely surrounding the oil-carrying surface and communicating with the reservoir through spaced openings so disposed that the rotation of the rotatable member establishes and maintains a constant flow of oil from the reservoir to the external periphery of the bearing members and thence inwardly to the thrust bearing surfaces and back into the reservoir.

28. A thrust bearing comprising a rotatable thrust member having a substantially horizontal axis, a coöperating member having a plurality of thrust sectors with oil spaces between them, an oil containing reservoir into which the rotatable member extends, and means on the rotatable member for establishing a flow of oil from the reservoir to the outer periphery of the bearing members and thence inwardly into the oil spaces between the sectors.

29. A thrust bearing comprising coöperating rotatable and stationary members, one of said members having a plurality of thrust sectors with oil spaces between them, an oil container into which the rotatable member of the bearing extends, and means dependent on the rotatable member for establishing a flow of oil upwardly to the top of the bearing and discharging it axially into the oil spaces between the thrust sectors.

30. A thrust bearing comprising a rotatable thrust member having a substantially horizontal axis, a coöperating member having a plurality of thrust sectors with oil spaces between them, an oil containing reservoir into which the rotatable member extends, and vanes on the rotatable member for establishing a flow of oil upwardly from the reservoir and discharging it axially into the oil spaces between the sectors.

31. A thrust bearing comprising coöperating rotatable and stationary members, one of said members having a plurality of thrust sectors with oil spaces between them, an oil container into which the rotatable member of the bearing extends, and projections or vanes on the rotatable member for transferring oil from the container to the external periphery of the bearing and discharging it axially into the oil spaces between the thrust sectors.

32. A thrust bearing comprising coöperative rotatable and stationary members, a cylindrical shell surrounding and inclosing the said members, means for cooling the inner periphery of the said shell, and means for discharging a continuous current of oil against the said cooled inner periphery and directing it into the openings between the bearing surfaces.

33. A thrust bearing comprising relatively rotatable bearing members, a cylindrical shell or housing surrounding the said members and forming therewith an annular oil chamber, means for cooling the inner periphery or wall of the said chamber, and means, dependent upon the rotative movement of one of the bearing members, for maintaining a constant flow of oil outwardly against the cooled inner wall of the chamber and thence inwardly to and between the coöperating thrust engaging surfaces of the bearing members.

34. A thrust bearing comprising relatively rotatable thrust members, one of which has an annular bearing surface and the other of which has a coöperating bearing surface provided with radial passages, means for establishing and maintaining a circulation of oil radially inward through the said radial passages to the openings between the bearing surfaces when the bearing is in operation, and means for cooling the oil before it enters the bearing openings.

35. A thrust bearing comprising in combination, two relatively rotatable members, a plurality of bearing shoes carried on one of the members and pivotally mounted thereon for free tilting movement in radial planes, and equalizing means for supporting one of said members and permitting it to rock in any direction, the parts being arranged to provide a continuous circulation of oil over the bearing surfaces and between the shoes when the bearing is in operation.

36. A thrust bearing comprising in combination two relatively rotatable bearing members, and means for mounting the said members whereby the engaging bearing surfaces thereof are maintained in radial parallelism under changes in axial alinement and unequal heating of the bearing parts, the parts of said bearing comprising means whereby flow of oil is automatically maintained between the engaged surfaces when the bearing is in operation.

37. A thrust bearing comprising relatively rotatable bearing members having coöperating bearing surfaces at least one of which is provided with radial oil passages, and means for establishing a circulation of oil radially inward through the said passages to the bearing surfaces when the bearing is in operation.

38. A thrust bearing comprising relatively rotatable bearing members having coöperating bearing surfaces at least one of which is provided with radial oil passages, and means on the rotatable bearing member for circulating the oil radially inward through the said passages to the bearing surfaces when the bearing is in operation.

39. A thrust bearing comprising in combination two relatively rotatable members, one of which is supported for tilting movement in any direction, and a plurality of bearing segments mounted on said tiltably supported member and adapted to tilt thereon in any direction.

40. In a thrust bearing, the combination of relatively rotatable members, a base mounted on one of said members and tiltable as a unit in any direction, and a plurality of bearing segments mounted on said base to tilt both transversely and circumferentially of the bearing and coöperating with the other of said relatively rotatable members.

41. A thrust bearing comprising relatively rotatable bearing members, one of said members comprising a plurality of thrust sectors with oil passages therebetween, an oil container into which the rotatable bearing member extends, and means on the rotatable member for transferring oil from said container and discharging it into the said oil passages.

42. A thrust bearing comprising relatively rotatable bearing members, one of said members comprising a plurality of thrust sectors with oil passages therebetween, an oil container into which the rotatable bearing member extends, means on the rotatable member for transferring oil from said container and discharging it into the said oil passages, and menas for cooling the oil before it enters said oil passages.

43. In a thrust bearing, the combination of relatively rotatable bearing members including a plurality of bearing segments, equalizing means for supporting said segments, and means for mounting the said segments on said equalizing means whereby said segments are capable of tilting both radially and circumferentially with respect to the plane of bearing engagement.

44. In a thrust bearing, the combination of relatively rotatable bearing members including a plurality of bearing segments, equalizing means for supporting said segments, and means for mounting the said segments on said equalizing means whereby said segments may tilt radially with respect to the axis of the bearing.

45. In a thrust bearing, the combination of relatively rotatable bearing members including a plurality of relatively tiltable bearing segments, and equalizing means on which said bearing segments are mounted for relative tilting movement both radially and circumferentially with respect to the axis of the bearing.

46. In a thrust bearing, the combination of relatively rotatable bearing members including a plurality of relatively tiltable bearing segments, and equalizing means on which said segments are mounted to tilt radially with respect to the axis of the bearing.

47. In a thrust bearing, the combination of relatively rotatable bearing members including a plurality of relatively tiltable bearing segments and automatically-operated equalizing means for supporting one of said bearing members, said segments being mounted to tilt both radially and circumferentially of the axis of the bearing.

48. In a thrust bearing, the combination of relatively rotatable bearing members including a plurality of radially tiltable bearing segments, and automatically-operated equalizing means for supporting one of said bearing members and equitably distributing the pressure on said bearing segments.

49. In a thrust bearing, the combination of relatively rotatable bearing members including a plurality of relatively tiltable bearing segments, equalizing means on which one of said bearing members is tiltably mounted, and means on the rotatable bearing member for providing a continuous flow of oil to the coöperating bearing surfaces of said members.

50. A thrust bearing comprising, in combination, relatively rotatable bearing members including a plurality of relatively tiltable bearing segments, equalizing means for supporting one of said bearing members, and means for providing a continuous flow of oil radially inward to the coöperating bearing surfaces of said members.

In witness whereof I have hereunto set my hand this 2nd day of February, 1918.

ALBERT KINGSBURY.